United States Patent
Choi et al.

(10) Patent No.: US 9,680,164 B2
(45) Date of Patent: Jun. 13, 2017

(54) CURRENT COLLECTOR FOR FUEL CELL AND STACK STRUCTURE INCLUDING THE SAME

(71) Applicant: MICO CO., LTD., Anseong-si (KR)

(72) Inventors: Song Ho Choi, Anseong-si (KR); Sang Pil Park, Anseong-si (KR)

(73) Assignee: MICO CO., LTD., Anseong-si (KR)

( * ) Notice: Subject to any disclaimer, the term of this patent is extended or adjusted under 35 U.S.C. 154(b) by 169 days.

(21) Appl. No.: 14/405,831

(22) PCT Filed: May 28, 2013

(86) PCT No.: PCT/KR2013/004632
§ 371 (c)(1),
(2) Date: Dec. 5, 2014

(87) PCT Pub. No.: WO2013/183884
PCT Pub. Date: Dec. 12, 2013

(65) Prior Publication Data
US 2015/0303491 A1    Oct. 22, 2015

(30) Foreign Application Priority Data
Jun. 8, 2012 (KR) .................. 10-2012-0061330

(51) Int. Cl.
| | | |
|---|---|---|
| *H01M 8/00* | (2016.01) | |
| *H01M 8/04* | (2016.01) | |
| *H01M 8/0247* | (2016.01) | |
| *H01M 8/0258* | (2016.01) | |
| *H01M 8/2465* | (2016.01) | |
| *H01M 8/0245* | (2016.01) | |
| *H01M 8/2483* | (2016.01) | |
| *H01M 8/124* | (2016.01) | |

(52) U.S. Cl.
CPC ....... *H01M 8/0247* (2013.01); *H01M 8/0245* (2013.01); *H01M 8/0258* (2013.01); *H01M 8/2465* (2013.01); *H01M 8/2483* (2016.02); *H01M 2008/1293* (2013.01)

(58) Field of Classification Search
CPC ........................ H01M 8/0247; H01M 8/0258
See application file for complete search history.

(56) References Cited

U.S. PATENT DOCUMENTS

| | | | | |
|---|---|---|---|---|
| 6,383,677 B1* | 5/2002 | Allen | ............... | H01M 4/8626 |
| | | | | 429/454 |
| 2003/0232234 A1* | 12/2003 | Cisar | ............... | H01M 8/0206 |
| | | | | 429/437 |
| 2005/0255365 A1* | 11/2005 | Ikezoe | ............ | H01M 8/0226 |
| | | | | 429/492 |

(Continued)

Primary Examiner — Matthew Merkling
(74) Attorney, Agent, or Firm — Norton Rose Fulbright US LLP

(57) ABSTRACT

Provided are a current collector for a fuel cell and a stack structure having the same. The fuel cell includes an electrolyte layer, and an air electrode layer and a fuel electrode layer on both surfaces of the electrolyte layer and generates electricity, and the current collector includes an even surface configured to electrically surface-contact with the air electrode layer or the fuel electrode layer; and a plurality of openings punched so that air or a fuel gas directly contacts with the air electrode layer or the fuel electrode layer.

11 Claims, 5 Drawing Sheets

(56) References Cited

U.S. PATENT DOCUMENTS

| | | | | |
|---|---|---|---|---|
| 2006/0286436 A1* | 12/2006 | Faghri | ............... | H01M 4/8817 |
| | | | | 429/465 |
| 2008/0311434 A1* | 12/2008 | Rey-Mermet | ....... | H01M 8/0247 |
| | | | | 429/406 |
| 2009/0098432 A1* | 4/2009 | Rosenberg | ............. | F28F 13/12 |
| | | | | 429/444 |

* cited by examiner

CURRENT COLLECTOR FOR FUEL CELL AND STACK STRUCTURE INCLUDING THE SAME

CROSS-REFERENCE TO RELATED APPLICATION

This application a national phase application under 35 U.S.C. 371 of International Patent Application No. PCT/KR2013/004632 filed May 28, 2013, which claims priority to and the benefit of Korean Patent Application No. 10-2012-0061330, filed on Jun. 8, 2012. The disclosures of the referenced applications are incorporated herein by reference.

BACKGROUND

1. Field of the Invention

The present invention relates to a current collector for a fuel cell which is capable of collecting electricity generated from a fuel cell and a stack structure having the same in which a plurality of fuel cells are stacked.

2. Discussion of Related Art

Generally, a fuel cell is a power generator which includes an air electrode layer and a fuel electrode layer on both sides of an electrolytic layer and generates electricity by flowing air including oxygen and a fuel gas including hydrogen to the air electrode layer and the fuel electrode layer, respectively, and electrochemically reacting the hydrogen and the oxygen through an ion conductive phenomenon in the electrolytic layer.

The above fuel cell has eco-friendly characteristics such as a highly efficient and pollution free power generator which has simple energy conversion steps and generates energy by theoretically oxidizing hydrogen, and thus, research is being actively processed recently.

In particular, a solid oxide fuel cell (SOFC) among the fuel cells is a fuel cell which uses a ceramic as an electrolytic material and operates at a high temperature in a range of 600 to 1,000° C., and has various advantages of the highest efficiency and lowest pollution among various types of fuel cells such as other molten carbonate fuel cell (MCFC), a phosphoric acid fuel cell (PAFC), a polymer electrolyte fuel cell (PEFC), and/or the like, and capability of combined generation without a fuel reformer.

A single cell is composed of a pair of an electrolyte layer, an air electrode layer, and a fuel electrode layer of the above fuel cell, and since the single cell generates a voltage less than about 1 V and does not have effectiveness, a technology of increasing a generated voltage by multiply stacking a plurality of single cells as a stack structure is being highlighted.

The above stack structure indispensably requires a plurality of interconnectors which electrically connect the single cells therebetween and have channels each configured to flow the air and the fuel gas at a position in contact with the air electrode layer and the fuel electrode layer of the single cell. Here, a charge collector is additionally disposed between the interconnector and the single cell to efficiently collect electricity generated from the single cells.

However, as a conventional charge collector is manufactured in a mesh shape weaved by wires, and since the conventional charge collector electrically point contacts with the interconnector and the single cells at junction portions at which the wires cross, charge collecting efficiency is decreased and loads are excessively concentrated on the point contact portions, thereby generating damage such as a crack in the single cells. In particular, the charge collector is bent by the load concentration by the above point contact at a channel portion of the interconnector, and is then separated from the single cell at the channel portion, thereby more decreasing the charge collecting efficiency.

Also, since the above charge collector has an uneven surface in a structure, a coating which prevents generation of a poisoning material on the surface thereof is not uniformly formed, thereby causing difficulty in a manufacturing process.

SUMMARY OF THE INVENTION

The present invention is directed to providing a current collector which is capable of efficiently collecting generated electricity by increasing an electric contact area.

Also, the present invention is directed to providing a stack structure including the above current collector, in which fuel cells are stacked.

One aspect of the present invention provides a current collector for a fuel cell, wherein the fuel cell includes an electrolyte layer, and an air electrode layer and a fuel electrode layer on both surfaces of the electrolyte layer and generates electricity. The current collector includes an even surface configured to electrically surface-contact with the air electrode layer or the fuel electrode layer, and a plurality of openings formed such that air or a fuel gas directly contacts with the air electrode layer or the fuel electrode layer.

In one embodiment of the present invention, the current collector may further include a channel forming portion configured to form a channel in which flows the air or the fuel gas.

In one embodiment of the present invention, a coating layer may be formed on a surface of the current collector.

In one embodiment of the present invention, the openings may be uniformly formed in the same shape or size.

In one embodiment of the present invention, the openings in adjacent rows or columns may be formed in an alternate structure.

In one embodiment of the present invention, the openings may be uniformly formed in different shapes or sizes in each area.

In one embodiment of the present invention, a corner of each of the openings may be roundly formed.

In one embodiment of the present invention, a thickness of the current collector may be in a range of about 0.1 to about 2 mm.

In one embodiment of the present invention, the openings may be formed by an etching process or a punching process.

Another aspect of the present invention provides a stack structure for a fuel cell, wherein a plurality of fuel cells are stacked in the stack structure and each of the fuel cells includes an electrolyte layer, and an air electrode layer and a fuel electrode layer on both surfaces of the electrolyte layer. The stack structure includes an interconnector configured to support and electrically connected to each fuel cell between the plurality of the fuel cells; and a current collector including an even surface configured to electrically surface-contact between the air electrode layer or the fuel electrode layer, and a plurality of openings formed such that air or a fuel gas directly contacts with the air electrode layer or the fuel electrode layer.

In one embodiment of the present invention, the current collector may further include channel forming portions configured to form a plurality of channels which uniformly flow the air or the fuel gas and surface-contact with the interconnector.

According to the current collector for a fuel cell and the stack structure having the same, both surfaces of the current collector are evenly manufactured so as to surface-contact with an air electrode layer or a fuel electrode layer of the fuel cell therebetween, and thus, current collecting efficiency of electricity generated from the fuel cell may be improved.

Also, in the stack structure multiply stacked by a plurality of fuel cells, since a load is dispersed by the above surface-contact, damage of the fuel cell by the load concentration by the point contact as mentioned in Background Art is prevented, and thus, physical stability may also be ensured. Also, as the surface of the current collector is even, a coating layer which prevents generation of a poisoning material on the surface is evenly formed, thereby preventing decrease of conductivity by the above poisoning material.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
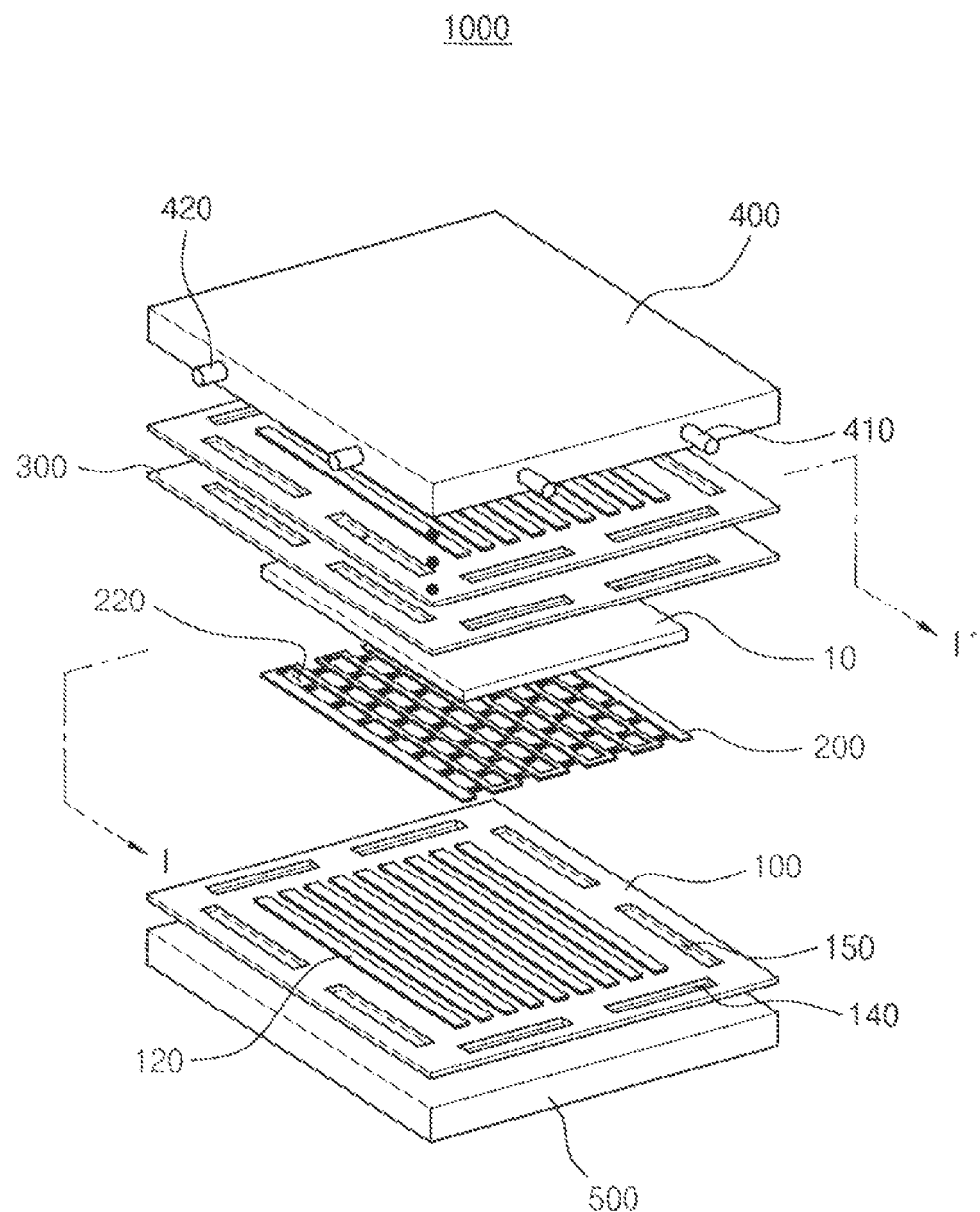
FIG. 1 is an exploded perspective view illustrating a stack structure according to an embodiment of the present invention.

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

In case it is mentioned that a certain component is "disposed" or "connected" on or to another component or layer, it may be understood that the certain component is directly disposed on or connected to the another component or that a component is interposed between the components. However, in case it is mentioned that a certain component is "directly" disposed or "connected" on or to another component, it should be understood that no component is interposed between the components. Though terms including ordinal numbers such as a "first", a "second", a "third", etc. may be used to explain various components, such as elements, composites, regions, layers and/or parts, the components are not limited to the terms.

Terms used in the present invention are to merely explain specific embodiments, thus it is not meant to be limiting. Except that they are not differently defined, all terms used in the present invention including technical or scientific terms have the same meanings with terms that are generally understood by those skilled in the art related to the field of the present invention. The terms same as those of which are defined in a general dictionary should be understood that the terms have meanings same as contextual meanings of the related art. And, as long as the terms are not definitely defined in the present invention, the terms are not interpreted as ideal or excessively formal meanings.

Examples of the present invention will be described with reference to cross-section drawings that are schematic drawings of ideal embodiments. Accordingly, the drawings allow changes in shape, for example, changes in manufacturing method and/or permissible error. In other words, the examples of the present invention are not limited to the specific shapes illustrated in the drawings but include some deviations in shape. Also, the regions shown in the drawings are merely schematic, and the shapes of the regions are intended neither to show the exact shapes of the regions nor to limit the scope of the invention.

Figure 4:
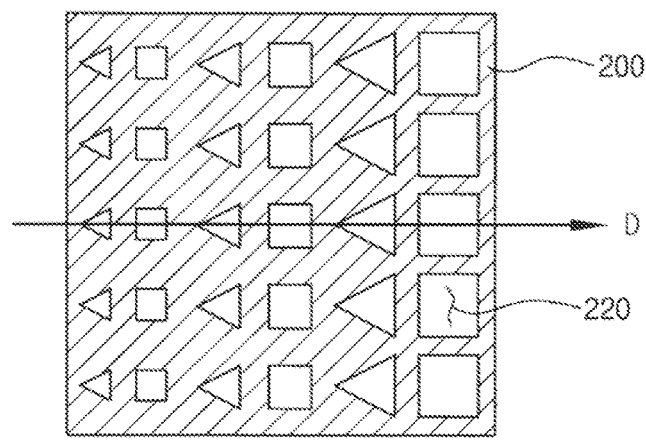
Figure 5:
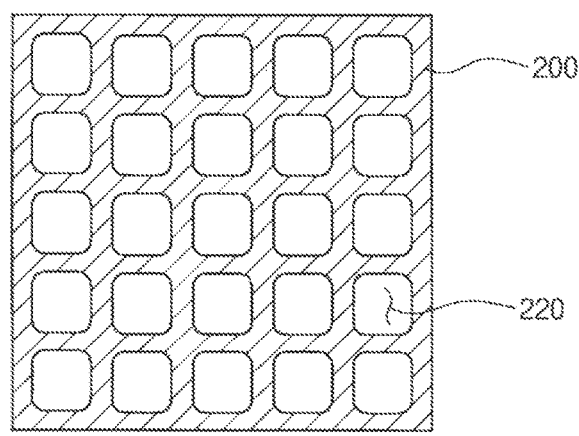
Figure 6:
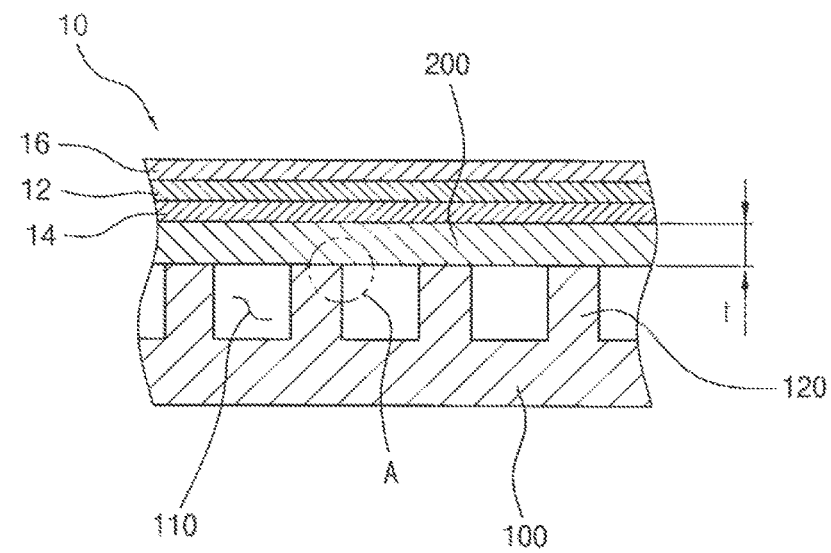
FIG. 6 is a view illustrating in detail a portion cut along line I-I' shown in FIG. 1.
Figure 7:
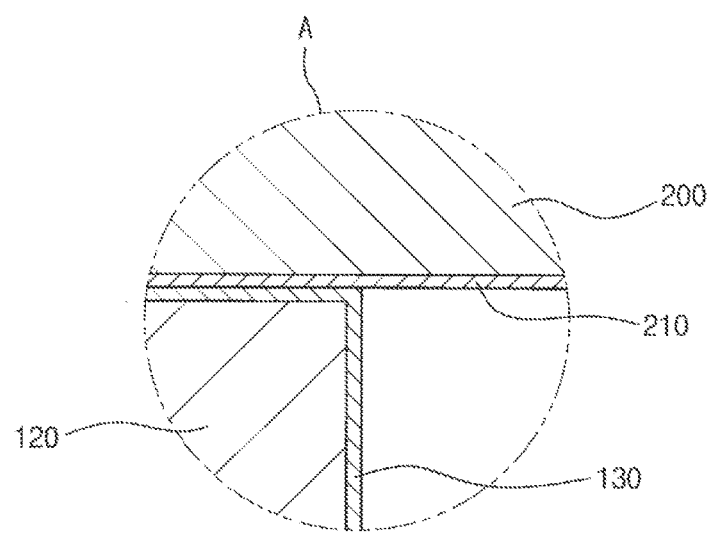
FIG. 7 is an enlarged view illustrating portion 'A' shown in FIG. 6.

FIG. 1 is an exploded perspective view illustrating a stack structure according to an embodiment of the present invention, FIGS. 2 to 5 are views illustrating a current collector of the stack structure shown in FIG. 1, FIG. 6 is a view illustrating in detail a portion cut along line I-I' shown in FIG. 1, and FIG. 7 is an enlarged view illustrating portion 'A' shown in FIG. 6.

Referring to FIGS. 1 to 7, a stack structure 1000 for a fuel cell according to the embodiment of the present invention includes a plurality of interconnectors 100 and a plurality of current collectors 200.

The interconnectors 100 are interposed between fuel cells 10 which have a planar structure. Here, the fuel cell 10 includes an electrolyte layer 12, and an air electrode layer 14 and a fuel electrode layer 16 which are respectively disposed on both surfaces of the electrolyte layer 12, and generates electricity. In particular, when air including oxygen and a fuel gas including hydrogen flow on the air electrode layer 14 and the fuel electrode layer 16, respectively, the hydrogen electrochemically reacts with the oxygen passing through the electrolyte layer 12 by an ion conductive phenomenon in the electrolyte layer 12, and thus, the fuel cell 10 generates the electricity.

The electrolyte layer 12 may be formed of a ceramic material such as yttria-stabilized zirconia (YSZ), (La, Sr)(Ga, Mg)O$_3$, Ba(Zr,Y)O$_3$, GDC (Gd doped CeO$_2$), YDC (Y$_2$O$_3$ doped CeO$_2$), and/or the like, which has high ion conductivity, excellent stability and excellent mechanical characteristics at an oxidization-reduction atmosphere. The fuel cell 10 having the above electrolyte layer 12 may include a solid oxide fuel cell (SOFC), and may be operated at a high temperature in a range of 600 to 1,000° C. The air electrode layer 14 may be formed in a porous structure using Lanthanum strontium manganite (LSM), Lanthanum strontium cobalt ferrite (LSCF), and/or the like. The LSM is a complex of lanthanum (La), strontium (Sr), and manganese (Mn), and the LSCF is a complex material of lanthanum (La), strontium (Sr), cobalt (Co), and iron (Fe). The fuel electrode layer 16 may be formed in a porous structure using a mixture of Yttria-Stabilized Zirconia (YSZ) and nickel (Ni), and thus, hydrogen may be transported.

The interconnector 100 is formed of a conductive material, and is electrically connected to the air electrode layer 14 or the fuel electrode layer 16 of the fuel cell 10. In particular, the fuel cells 10 may be connected in series by the interconnectors 100, and thus, an electricity of a high voltage may be generated from the fuel cells 10.

Also, the interconnector 100 includes channel forming portions 120, which includes partition walls to form a plurality of channels 110 capable of uniformly flowing the air or the fuel gas on a surface of the air electrode layer 14 or the fuel electrode layer 16 of the fuel cells 10. Here, since one of an upper surface and a lower surface of the interconnector 100 is electrically connected to one of the air electrode layer 14 and the fuel electrode layer 16 of the fuel cells 10 and the other of an upper surface and a lower surface of the interconnector 100 is electrically connected to the other of the air electrode layer 14 and the fuel electrode layer 16, the channel forming portions 120 may be formed on the upper surface and the lower surface of the interconnector 100.

Thus, the stack structure 1000 may further include a sealing part 300 configured to seal a space between the interconnectors 100 and prevent the air or the fuel gas which flows each of the upper surface and the lower surface of the interconnector 100 from being mixed. The sealing part 300 may include a glass sealant having an excellent sealing property, and in this case, have fluidity based on characteristics of glass, and thus, fibers may be added to the glass sealant, in order to suppress the fluidity.

The interconnector 100 may be formed of an SUS-Cr material to endure the fuel cell 10 which is operated at a high temperature in a range of about 600 to 1,000° C. In this case, in order to prevent decrease of conductivity by formation of a $CrO_2$ film, which is oxidized from a poisoning material Cr among the above materials, on a surface of the interconnector 100, a first coating layer 130 may be additionally formed on the surface of the interconnector 100. The first coating layer 130, for example, may include Lanthanum strontium manganite (LSM) or Lanthanum strontium cobalt ferrite (LSCF). Alternatively, the first coating layer 130 may be composed of a composite material including at least one or more selected from manganese (Mn), cobalt (Co), copper (Cu), iron (Fe), nickel (Ni), zinc (Zn), tin (Sn), and titanium (Ti).

The current collectors 200 are interposed between the interconnector 100 and the air electrode layer 14 or the fuel electrode layer 16 of the fuel cells 10, and are electrically connected thereto. For example, the current collector 200 is electrically connected to the channel forming portions 120 while substantially exposed by the channels 110 of the interconnector 100. The above current collectors 200 collect electricity generated by each of the fuel cells 10 to efficiently get the generated electricity. Here, the current collectors 200 may be directly stacked without binding together with the interconnectors 100 and the fuel cells 10, but in other cases, each of the current collectors 200 is firstly bound to ach of the interconnectors 100 through a welding, a brazing, a bonding, a bolting, or a clamping method, and then, may be stacked with the fuel cells 10. Also, the current collectors 200 may be respectively integrally formed with the interconnectors 100, and in this case, since the current collector 200 and the interconnector 100 do not have contact resistance, charge collecting efficiency by the current collectors 200 may be greatly improved. The above stack method of the current collectors 200 and the interconnectors 100 may be applied to a following embodiment of the present invention with reference to FIG. 10 in the same method.

The current collectors 200, similar to the interconnector 100, may be formed of a metal material including Cr to endure the fuel cell 10 which is operated at a high temperature in a range of about 600 to 1,000° C., for example, the same SUS-Cr material as that of the interconnector 100. In this case, in order to prevent decrease of conductivity by formation of a $CrO_2$ film, which is oxidized from a poisoning material Cr, on a surface of the current collector 200, a second coating layer 210 may be additionally formed on the surface of the current collector 200. The second coating layer 210, substantially, may be formed of the same material as that of the first coating layer 130 formed on the interconnector 100.

The above current collector 200 may include a metal thin plate having a plurality of openings 220 which pass through the metal thin plate. For example, the current collector 200 may be manufactured by forming a plurality of openings 220 in a metal thin plate having both flat surfaces such that the openings 220 pass through the metal thin plate. Thus, the air and the fuel gas directly contacts with the air electrode layer 14 and the fuel electrode layer 16 through the openings 220, respectively. Upper and lower surface areas of the current collector 200 except for the openings 220 may be flat. Here, the openings 220 of the current collector 200 may be formed through an etching process of the metal thin plate using a mask, or mechanically formed by directly punching the metal thin film using additional equipment. Thus, a thickness 't' of the current collector 200, which is a thickness of the metal thin plate, may be preferably formed as thin as possible so as not to exceed about 2 mm at which an overall thickness of the stack structure 1000 is affected; however, a too small thickness less than about 0.1 mm may damage during the formation of the openings 220, and thus, the thickness may preferably be in a range of about 0.1 to 2 mm.

Thus, the current collector 200 surface-contacts with the channel forming portions 120 of the interconnector 100 and the air electrode layer 14 or the fuel electrode layer 16 of the fuel cell 10, and thus current collecting efficiency of the electricity generated from the fuel cell 10 may be improved. In particular, since the current collector 200 may be manufactured of one metal thin plate, a joint portion which is formed by a welding method or a soldering method does not exist, and thus, the contact resistance is decreased, thereby further improving conductivity.

Figure 8:
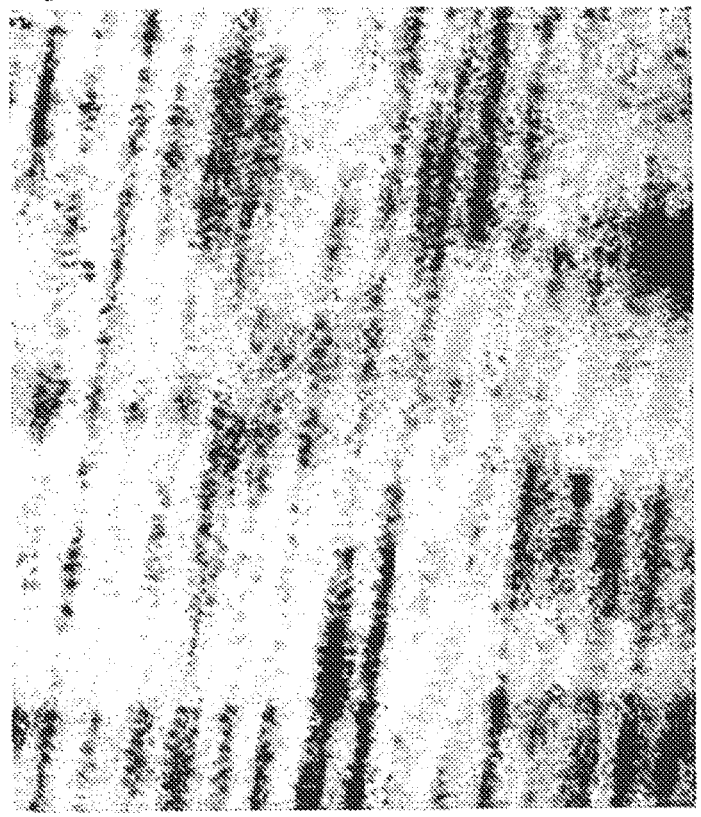
FIGS. 8 and 9 are experimental images illustrating a conventional current collector and the current collector of the present invention each in a state of load application in the stack structure shown in FIG. 1.
Figure 9:
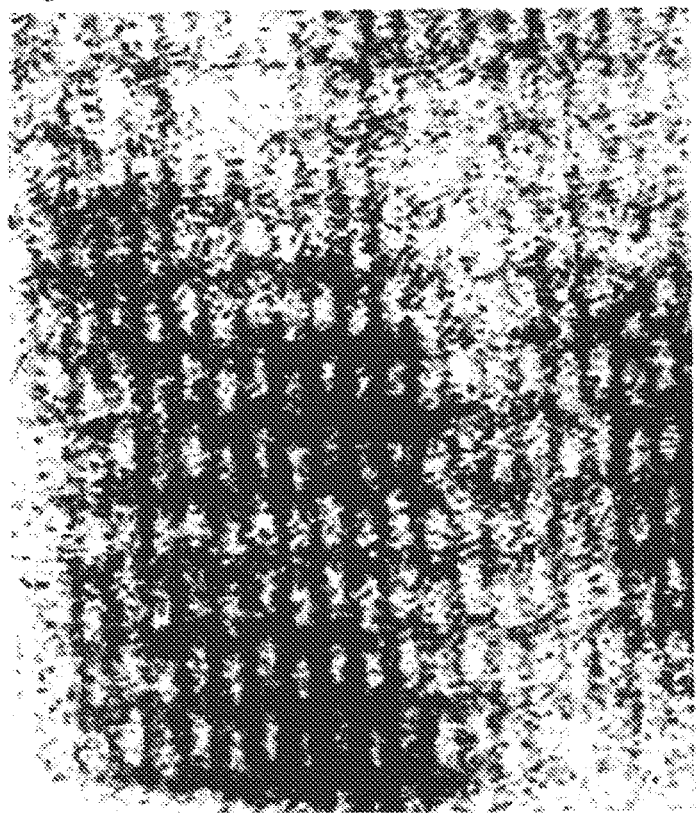

Also, in the stack structure 1000 in which the plurality of the fuel cells 10 are stacked, a load is dispersed by the above surface-contact, and thus, damage of the fuel cell 10 by concentration of the load caused by a point-contact as mentioned in the 'Discussion of Related Art' is prevented, thereby ensuring physical stability. Regarding this, in the stack structure including the current collector described in the 'Discussion of Related Art', a stress state which transmits the load as illustrated in the experimental image of FIG. 8 locally appears only at positions of channel forming portions in a stripe shape. However, in the stack structure 1000 including the current collector 200 according to the present invention, it can be identified that a stress state which transmits the load as illustrated in FIG. 9 is entirely uniformly distributed. Here, the experimental images shown in FIGS. 8 and 9 are images illustrating stress distributions by application of a pressure of about 0.3 MPa on each stack structure.

Also, since a surface of the current collector 200 except for the openings 220 is flat, the second coating layer 210 explained above may be evenly formed on the surface thereof, and thus, decrease of conductivity by the poisoning material may be effectively prevented. Here, the second coating layer 210, for example, may be formed through an atmospheric plasma spray method or a screen printing method.

Hereinafter, a structure of the current collector 200 will be explained in more detail, and the current collector 200 includes the openings 220 separated from each other and a flat area between the openings 220. In the fuel cell 10, contact of the air or the fuel gas to the air electrode layer 14 or the fuel electrode layer 16 in the channels 110 of the interconnector 100 as much as possible is most important, and thus, in the current collector 200, the openings 220 are preferably formed at only corresponding portions at which the channels 110 of the interconnector 100 are formed. Here, a width of the current collector 200 is preferably formed to be the same as or greater than a width of each of the channel forming portions 120 of the interconnector 100 so as to entirely surface-contact with the channel forming portions 120. Also, in order to prevent deformation of an overall shape of the relatively thin current collector 200 by the openings 220, each of the openings 220 formed corresponding to the channels 110 is preferably formed to be divided into plural.

Also, the openings 220 of the current collector 200 may be formed to have uniform patterns. Thus, the current collector 200 according to the embodiment of the present invention may include the openings 220 formed along each of adjacent first and second rows R1 and R2 shown in FIG. 2 to have an alternate structure.

Here, directions of the first and second rows R1 and R2 are preferably aligned parallel with longitudinal directions of the channel forming portions 120 of the interconnector 100 so that the current collector 200 maintains entirely electrical surface-contact with the channel forming portions 120. Then, since the current collector 200 may have relatively uniform strength in a row direction based on shapes of the alternate openings 220, a deformation probability of the current collector 200 by the load of the stack structure 1000 may be further excluded. Thus, the current collector 200 securely maintains the electrical surface-contact between the channel forming portions 120 of the interconnector 100 and the air electrode layer 14 or the fuel electrode layer 16 of the fuel cell 10.

Figure 2:
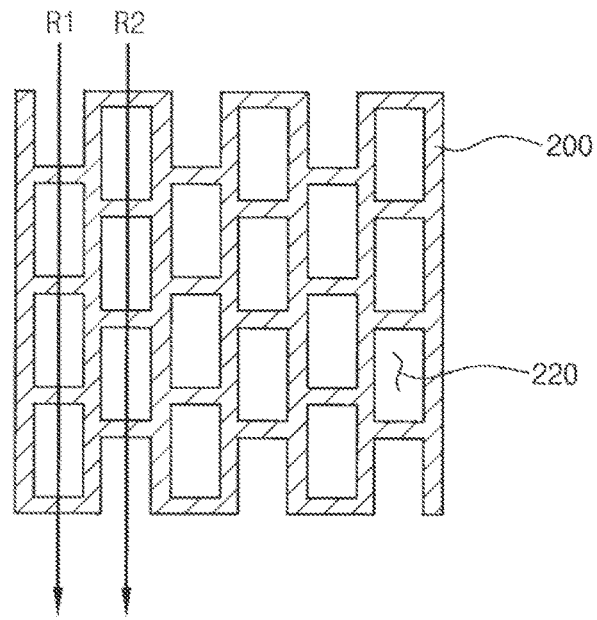
FIGS. 2 to 5 are views illustrating a current collector of the stack structure shown in FIG. 1.
Figure 3:
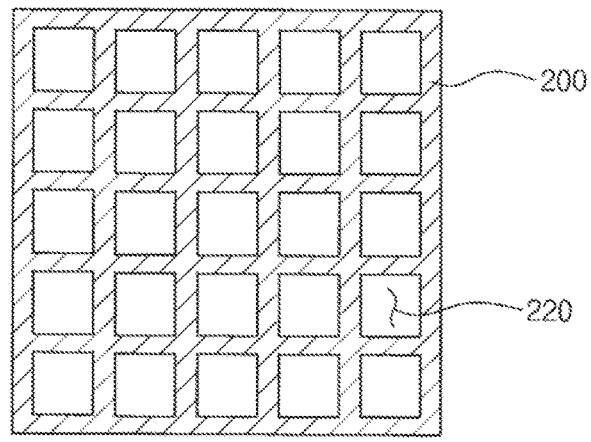

The openings 220 of the current collector 200 according to another embodiment of the present invention may be formed in a uniform lattice pattern in row and column directions as shown in FIG. 3. Then, in FIG. 2, without aligning the column direction of the current collector 200 parallel with longitudinal directions of the channel forming portions 120 of the interconnector 100, a secure electrical surface-contact state may be maintained despite being aligned parallel with any direction among the row and column directions.

The openings 220 of the current collector 200 according to still another embodiment of the present invention may be uniformly formed in different shapes or sizes in each area as shown in FIG. 4. For example, the openings 220 may be formed to be increased in sizes in every predetermined area along a direction D in which the air or the fuel gas provided from the outside flows. Then, the openings 220 are formed in relatively small sizes adjacent to an area in which the air or the fuel gas is supplied, and thus, a current collecting efficiency may be improved through the current collector 200 of a relatively wide contact area while air or a fuel gas of a relatively high pressure smoothly contacts with the air electrode layer 14 or the fuel electrode layer 16. In contrast, since the openings 220 are formed in relatively large sizes adjacent to an area in which the air or the fuel gas are exhausted, air or a fuel gas of a relatively lowered pressure contacts with the air electrode layer 14 or the fuel electrode layer 16 in a larger area, and thus a contact efficiency may be improved. Also, a shape of each of the openings 220 may be formed to have a wide width along the direction D in which the air or the fuel gas flows, and thus, the same effect as described above may be expected. Thus, the openings 220 according to the embodiment of the present invention may be formed to have various shapes or sizes according to a method of supplying the air or the fuel gas.

Each of the openings 220 of the current collector 200 according to yet another embodiment of the present invention may have a rounded corner as shown in FIG. 5. Then, a whirlpool to be formed at sharp edges of the openings 220 is prevented, and the air or the fuel gas may smoothly contact with the air electrode layer 14 or the fuel electrode layer 16, thereby preventing decrease of an efficiency of electricity generation.

According to the embodiments of the present invention, since the openings 220 of the current collector 200 are formed in various shapes, a surface-contact area between the current collector 200 and the air electrode layer 14 or the fuel electrode layer 16 of the fuel cell 10 may be adjusted. For example, when an excessive heat generation occurs during an electrochemical reaction of the fuel cell 10, the surface-contact area of the current collector 200 may be increased by adjusting the shapes of the openings 220, and thus, the excessive heat may be effectively dissipated, thereby additionally ensuring thermal stability.

Referring again to FIG. 1, the stack structure 1000 may further include an upper case 400 and a lower case 500 which are respectively stacked as an uppermost part and a lowermost part to protect the fuel cells 10, the interconnectors 100, and the current collectors 200 from the outside and provide an overall strength.

First and second connection tubes 410 and 420, which are connected to an air supply device (not shown) and a fuel gas supply device (not shown) provided from the outside to respectively supply the air and the fuel gas to the air electrode layer 14 and the fuel electrode layer 16, may be formed in the upper case 400. The first and second connection tubes 410 and 420 may be formed on different side portions perpendicular to each other to independently supply the air or the fuel gas to each of the air electrode layer 14 and the fuel electrode layer 16 of the fuel cell 10. Thus, air holes 140 and fuel holes 150 of the interconnector 100, which are respectively coupled to the first and second connection tubes 410 and 420, may be formed on the perpendicular side portions of the interconnector 100, thereby independently supplying and discharging the air or the fuel gas supplied from the first and second connection tubes 410 and 420. In the embodiment of the present invention, the first and second connection tubes 410 and 420 are formed in the upper case 400, but may be formed in the same position of the lower case 500, thereby performing an enough function of the above.

Figure 10:
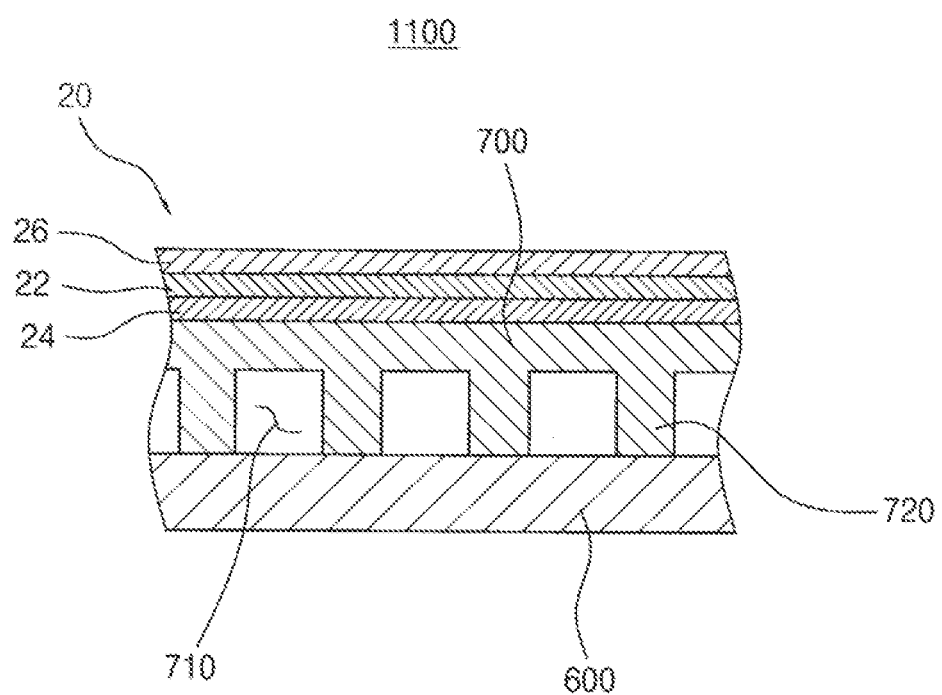
FIG. 10 is a view illustrating in detail a portion cut along the line I-I' shown in FIG. 1 according to another embodiment.

FIG. 10 is a view illustrating in detail a portion cut along the line I-I' shown in FIG. 1 according to another embodiment.

In the embodiment of the present invention, the stack structure is the same as the structure illustrated in FIGS. 1 to 7 except a structure which forms channels to directly contact air or a fuel gas to an air electrode layer or a fuel electrode layer, and thus, any repetitive detailed explanation will be omitted.

Referring to FIG. 10, a stack structure 1100 according to the embodiment of the present invention includes a current collector 700 which is disposed between an interconnector 600 and an air electrode layer 24 or a fuel electrode layer 26, and includes partition walls configured to form channels 710 so that air or a fuel gas directly contacts with the air electrode layer 24 or the fuel electrode layer 26 while surface-contacting with the air electrode layer 24 or the fuel electrode layer 26 and the interconnector 600.

Thus, when the current collector 700 includes openings as shown in FIGS. 2 and 3, channel forming portions 720 of the current collector 700 may include first partition walls relatively highly protruding from first flat areas between the openings which are elongated along one of a column direction and a row direction and second partition walls relatively low protruding from second flat areas between the openings which are elongated along the other of a column direction and a row direction. Thus, the air or the fuel gas may smoothly flow through channels formed by channel forming portions 720. The above structure has substantially a 3-dimensional structure, and is more preferably thinly formed so as to guide the air or the fuel gas to smoothly flow while an overall shape of the current collector 700 is maintained.

Also, since the current collector 700 is generally formed at a thickness smaller than that of the interconnector 600, the channel forming portions 720 may have a wedge shape narrowing in a direction toward the interconnector 600 so as to reinforce a strength with respect to the load applied to the stack structure 1100. In contrast, as the channel forming portions 720 of the current collector 700 are formed to widen in the direction toward the interconnector 600, a contact area with the interconnector 600 may be increased, and thus, a charge collecting efficiency may be more improved. A structure of the channel forming portions 720 may also be applied to the channel forming portions 720 of the interconnector 600 shown in FIG. 6, and the same effect may be expected.

As mentioned above, in the current collector 700, as the channel forming portions 720 of the same structure are formed in the 3-dimensional structure instead of the channel forming portions 120 (shown in FIG. 6) formed in the interconnector 100 (shown in FIG. 6) according to the embodiment shown in FIG. 6, the structure of the interconnector 600 is simplified, thereby easily manufactured.

While the stack structures 1000 and 1100 of the present invention explained above are explained to be applied to the SOFC using a ceramic as an electrolyte, it can also be understood to be applied to another fuel cell such as a MCFC, a PAFC, or a PEFC which has a stack structure to increase an electric power.

The present invention has been particularly shown and described with reference to the embodiments illustrated in the appended drawings. The embodiments are, however, provided as examples only used for a better understanding of the present invention. It would be obvious to those of ordinary skill in the art that the above embodiments are to cover all modifications, equivalents, and alternatives falling within the scope of the invention. Accordingly, it will be understood that various changes in form and details may be made therein without departing from the spirit and scope of the following claims.

According to the above, in a stack structure in which a plurality of fuel cells are stacked, since a current collector which collects electricity generated from the fuel cells is evenly manufactured to surface-contact with the fuel cells and interconnectors, it can be used to improve charge collecting efficiency of a stack structure for a fuel cell. Also, a load of the stack structure is dispersed through the surface-contacting current collector, and thus, can be used to ensure physical stability of the stack structure.

What is claimed is:

1. A stack structure for a fuel cell, wherein a plurality of fuel cells which include an electrolyte layer, and an air electrode layer and a fuel electrode layer on both surfaces of the electrolyte layer are stacked in the stack structure, the stack structure comprising:

an interconnector disposed between a first and second fuel cells, which are adjacent to each other, of the plurality of fuel cells and electrically connected to the air electrode layer of the first fuel cell and the fuel electrode layer of the second fuel cell, the interconnector formed of a conductive material comprising first partition walls disposed on an upper surface of the interconnector to form a plurality of first channels on the upper surface and second partition walls disposed on a lower surface of the interconnector to form a plurality of second channels on the lower surface;

a current collector disposed between the air electrode layer of the first fuel cell and the interconnector to electrically connect the air electrode layer of the first fuel cell with the interconnector, the current collector including a metal thin plate, through which a plurality of openings pass through such that air directly contacts with the air electrode layer of the first fuel cell, having an upper even surface surface-contacting with the air electrode layer of the first fuel cell and a lower even surface surface-contacting with the first partition walls;

wherein the openings are positioned along the first channels formed between the first partition walls, wherein the upper and lower surfaces of the metal thin plate except for the openings are flat, and wherein the current collector surface-contacts with the air electrode layer of the first fuel cell and the first partition walls to disperse a load of the stack structure in which the plurality of the fuel cells are stacked.

2. The stack structure for the fuel cell of claim 1, wherein the current collector is integrally formed with the interconnector.

3. The stack structure for the fuel cell of claim 1, wherein the openings are arranged in a plurality of rows which are parallel with the first channels respectively, and the even surface of the metal thin plate between adjacent rows of the plurality of rows to each other has a width which is the same as or greater than a width of each of the first partition walls.

4. The stack structure for the fuel cell of claim 1, wherein the metal thin plate is formed of a Cr-containing conductive material.

5. The stack structure for the fuel cell of claim 4, wherein the current collector further comprises a first coating layer formed on a surface of the metal thin plate and the first coating layer comprises a composite material including at least one or more selected from manganese (Mn), cobalt (Co), copper (Cu), iron (Fe), nickel (Ni), zinc (Zn), tin (Sn), and titanium (Ti).

6. The stack structure for the fuel cell of claim 1, wherein the openings are uniformly formed in the same shape or size.

7. The stack structure for the fuel cell of claim 1, wherein the openings in adjacent rows parallel with the first channels are arranged alternately.

8. The stack structure for the fuel cell of claim 1, wherein at least one of the openings has a different shape or size as compared to at least one of the other openings.

9. The stack structure for the fuel cell of claim 7, wherein one opening of the openings disposed adjacent to an area in which the air is supplied into the first channels has a size smaller than that of another opening of the openings disposed adjacent to an area in which the air is exhausted from the first channels.

10. The stack structure for the fuel cell of claim 1, wherein a corner of each of the openings is roundly formed.

11. The stack structure for the fuel cell of claim 1, wherein a thickness of the metal thin plate is in a range of 0.1 to 2 mm.

* * * * *